United States Patent
Aoyama et al.

(10) Patent No.: US 6,577,585 B2
(45) Date of Patent: Jun. 10, 2003

(54) SKEW ADJUSTMENT FOR DISK DRIVE APPARATUS

(75) Inventors: Takashi Aoyama, Tokyo (JP); Hitoshi Taniguchi, Kanagawa (JP)

(73) Assignee: Sony Corporation (JP)

( * ) Notice: Subject to any disclaimer, the term of this patent is extended or adjusted under 35 U.S.C. 154(b) by 54 days.

(21) Appl. No.: 09/725,074

(22) Filed: Nov. 29, 2000

(65) Prior Publication Data

US 2001/0006506 A1 Jul. 5, 2001

(30) Foreign Application Priority Data

Nov. 30, 1999 (JP) .......................................... 11-341379

(51) Int. Cl.⁷ .............................................. G11B 21/24
(52) U.S. Cl. ...................................... 369/255; 369/219
(58) Field of Search .............................. 369/255, 219, 369/244, 249, 215

(56) References Cited

U.S. PATENT DOCUMENTS

| | | | | |
|---|---|---|---|---|
| 4,996,619 A | * | 2/1991 | Negishi et al. | 360/294.1 |
| 5,615,204 A | * | 3/1997 | Watanabe et al. | 369/247 |
| 5,761,182 A | * | 6/1998 | Jeon | 369/219 |
| 5,764,618 A | * | 6/1998 | Kim | 369/219 |
| 5,768,248 A | * | 6/1998 | Lee | 369/219 |
| 5,982,735 A | * | 11/1999 | Tsai | 369/249 |
| 5,995,478 A | * | 11/1999 | Park | 369/219 |
| 5,995,479 A | | 11/1999 | Takizawa et al. | |

FOREIGN PATENT DOCUMENTS

JP    03-225627    * 10/1994    ........... G11B/07/08

OTHER PUBLICATIONS

Australian Search Report.
Australian Written Opinion.

* cited by examiner

Primary Examiner—William Korzuch
Assistant Examiner—Christopher R Beacham
(74) Attorney, Agent, or Firm—Rader, Fishman & Grauer PLLC; Ronald P. Kananen

(57) ABSTRACT

The hard disk apparatus has first and second skew adjust members 21 and 22 for adjusting inclinations or an inclination of a main guide shaft 16 and/or a sub-guide shaft 17. The first and second skew adjust members comprise: bearing parts 41 or a bearing part 41 provided such that the centers or center of shaft holes 43 or a shaft hole 43 in which ends or an end of a main guide shaft 16 and/or a sub-guide shaft 17 is inserted and supported is deviated from the centers or center of end surfaces or an end surface of the main guide shaft 16 and/or a sub-guide shaft 17, the end surfaces or end surface being substantially perpendicular to the axial directions or axial direction of the main guide shaft 16 and/or the sub-guide shaft 17; and first, second, and third contact surfaces A, B, and C that are brought into contact with a support base 8, the first, second, and third contact surfaces forming a substantially rectangular outer circumference.

7 Claims, 6 Drawing Sheets

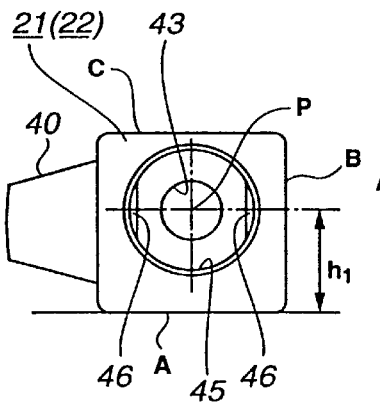
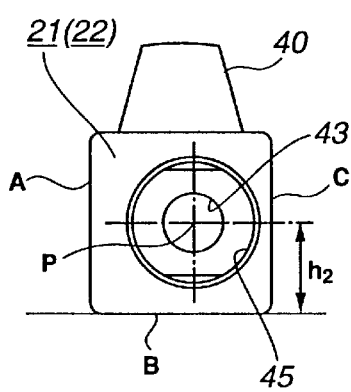
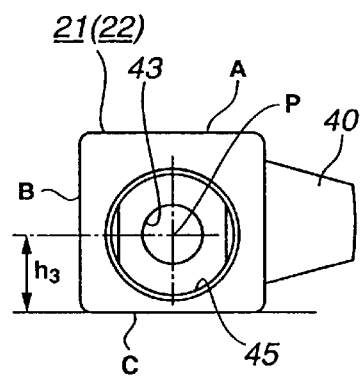
FIG.9A     FIG.9B     FIG.9C
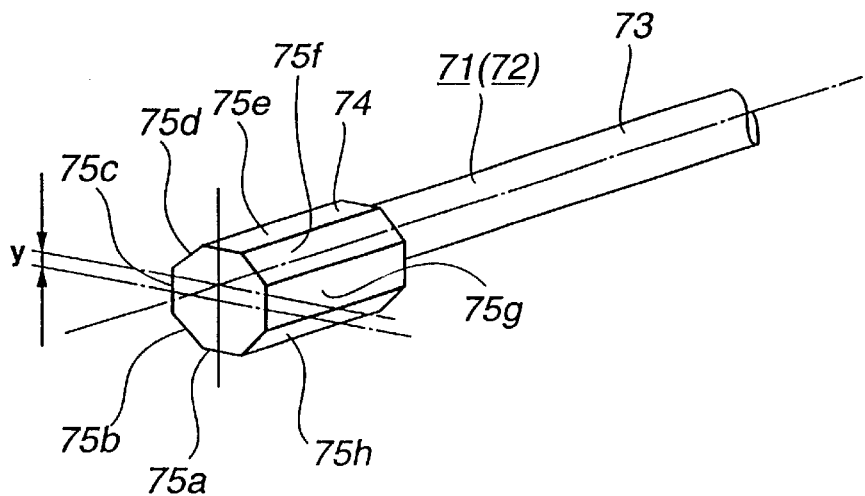
FIG.10

SKEW ADJUSTMENT FOR DISK DRIVE APPARATUS

BACKGROUND OF THE INVENTION

The present invention relates to a disk drive apparatus for recording and/or reproducing information on and/or from an optical disk such as an optical disk, magneto-optical disk, or the like.

For example, an optical pickup is known as a device for recording and/or reproducing information on and/or from an optical disk such as an optical disk, magneto-optical disk, or the like.

This kind of optical pickup includes an optical system having an objective lens for irradiating a laser beam on an optical disk, and a two-axis actuator for driving and shifting the objective lens in two directions, one being a direction parallel to the optical axis of the objective lens and the other being a direction perpendicular to the optical axis of the objective lens.

Further, a disk drive apparatus having an optical pickup comprises a feed mechanism for feeding the optical pickup in a direction parallel to the radial direction of an optical disk, a disk rotation drive mechanism for rotating the optical disk, and a support base for supporting the feed mechanism and the disk rotation mechanism.

The feed mechanism includes a slide base which supports the optical pickup, a main guide shaft and a sub guide shaft which support the slide base to be movable in the radial direction of the optical disk, and a drive mechanism which operates to feed the slide base. The slide base has a hold part which holds the pickup, and a support part supported to be movable by the main guide shaft and the sub guide shaft. The main guide shaft and the sub guide shaft are provided in parallel with the radial direction of the optical disk and also in parallel each other. These shafts are supported on the support base through a support member. The drive mechanism includes a rack member attached to the slide base, a group of gears for moving the rack member, and a feed motor for rotating and driving the group of gears. The rack member is engaged with a gear of the grouped gears. The disk rotation drive mechanism includes a disk table where an optical disk is mounted, and a spindle motor for rotating and driving the disk table. The support base is provided with an opening portion which enables movement of the optical pickup. The optical pickup is movably provided in the opening portion.

In the disk drive apparatus constructed as described above, the optical disk is rotated and driven by the disk rotation drive mechanism, so that the optical pickup is moved in the radial direction of the optical disk, thereby to perform recording and/or reproducing of information on and/or from a desired recording track of the optical disk.

Meanwhile, in a disk drive apparatus, a so-called skew occurs, i.e., the optical axis of the objective lens of the optical pickup is inclined with respect to the optical disk. In the disk drive apparatus, the state (hereinafter called a skew) of the optical pickup inclined relatively to the recording surface of the optical disk influences greater the recording/reproducing characteristics of information and results in a problem that assembling errors are often caused by the skew. Therefore, the disk drive apparatus must excellently adjust the skew.

A skew is caused by inclination of the axial directions of the main guide shaft and the sub guide shaft in the feed mechanism, or a warp of the disk table of the disk rotation drive mechanism, the rotation shaft of the spindle motor, or the support base.

In a conventional disk drive apparatus, the main guide shaft and the sub guide shaft are directly fixed on the support base or fixed thereto through a support member, so that their positions in the axial direction are fixed with respect to the support base. Therefore, there is a problem that it is difficult to adjust inclinations of the main guide shaft and the sub guide shaft with respect to the axial direction.

As a countermeasure for the skew, there can be a method in which assembly is carried out while mechanically adjusting the inclinations of the optical pickup and spindle motor which are set on the slide base of the feed mechanism, or a method in which recording and/or reproducing is performed excellently by detecting a skew and making electric control during recording and/or reproducing of an optical disk.

However, in the above-mentioned method of making adjustment during assembly, the optical pickup is assembled on the slide base while detecting an optimal value of a skew with the disk rotation drive mechanism driven to rotate. Therefore, there is a drawback that the production efficiency is remarkably lowered, and the equipment costs for an assembling device and the like are increased. Further, in this method of making adjustment during assembly, the optical pickup is difficult to detach and attach when making recovery of a malfunction or maintenance services. In the other method of electrically controlling the skew during recording and/or reproducing, the inclination of the optical pickup is constantly controlled by a motor or the like. Therefore, the number of components is increased, so that the manufacturing costs increase and high costs are required for control programs and the like.

BRIEF SUMMARY OF THE INVENTION

The present invention hence has an object of providing a disk drive apparatus capable of easily and steadily adjusting a relative inclination of an optical pickup with respect to an optical disk.

To achieve the above object, a disk drive apparatus according to the present invention includes: a slide base having an optical pickup for recording and/or reproducing information on and/or from an optical disk; main and sub guide shafts provided in parallel with an radial direction of the optical disk, for supporting movably the slide base; a support base for supporting the main and sub guide shafts; and an adjust member having a bearing part provided such that a center of a shaft hole in an end of the main guide shaft and/or the sub guide shaft is inserted and supported is deviated from a center of an end surface substantially perpendicular to the axial direction of the main guide shaft and/or the sub guide shaft, and a plurality of contact surfaces, which form a substantially polygonal outer circumference and are brought into contact with the support base, thereby to adjust an inclination of the axial direction of the main guide shaft and/or the sub guide shaft.

Furthermore, a disk drive apparatus according to the present invention includes: a slide base having an optical pickup for recording and/or reproducing information on and/or from an optical disk; a guide shaft provided along a radial direction of the optical disk, for supporting movably the slide base; a support base for supporting the guide shafts; and an adjust member having a bearing part, an outer circumference formed in a substantially polygonal shape, and a plurality of contact surfaces to be brought into contact with the support base, thereby to adjust an inclination of an axial direction of the guide shaft, the bearing part being provided such that a center of a shaft hole in which an end of the guide shaft is inserted and supported is deviated from a center of an end surface substantially perpendicular to the axial direction of the guide shaft.

In the disk drive apparatus constructed as described above, the adjust member is rotated about the axis of the main or sub guide shaft, thereby to bring an arbitrary contact surface on the outer circumference into contact with the support base. As a result of this, the center of the shaft hole of the bearing part changes, because the center of the shaft hole of the bearing part is deviated from the center of the end surface. Therefore, inclinations of the axial directions of the main and sub guide shafts supported by the adjust member changes as the position of the shaft hole of the bearing part changes, in the disk drive apparatus. Thus, according to this disk drive apparatus, the inclination of the optical pickup relatively to the optical disk can be easily adjusted by rotating the adjust member about its axis.

BRIEF DESCRIPTION OF THE SEVERAL VIEWS OF THE DRAWINGS

FIG. 9, consisting of FIGS. 9A through 9C is a front view for explaining a state where skews are adjusted by rotating the skew adjust member.

FIG. 10 is a perspective view explaining other main and sub guide shafts.

DETAILED DESCRIPTION OF THE INVENTION

In the following, specific embodiments of the present invention will be explained to a disk drive apparatus which records/reproduces information on/from an optical disk, with reference to the drawings.

Figure 1:
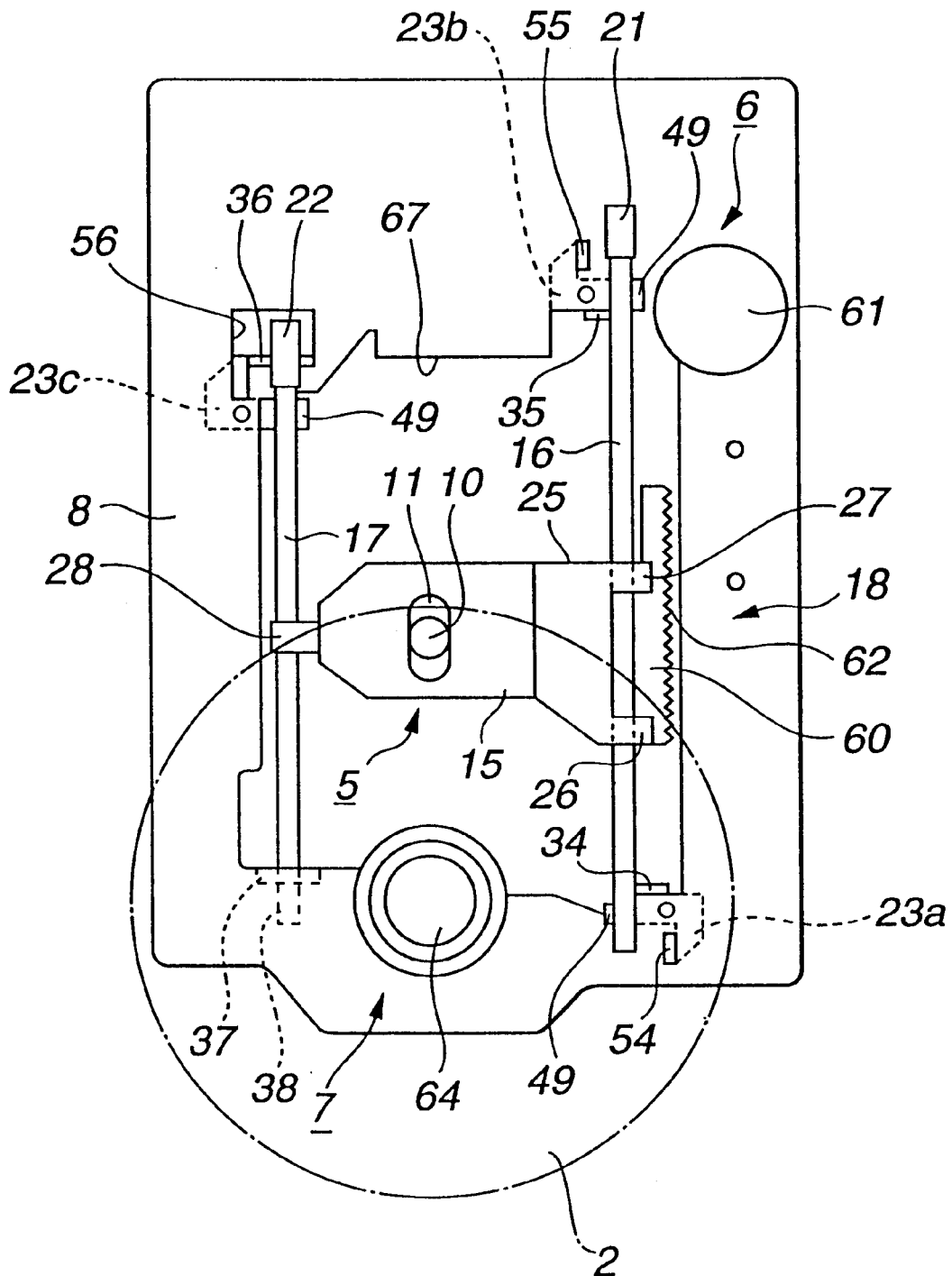
FIG. 1 is a plan view showing a main part of a disk drive apparatus according to the present invention.
Figure 2:
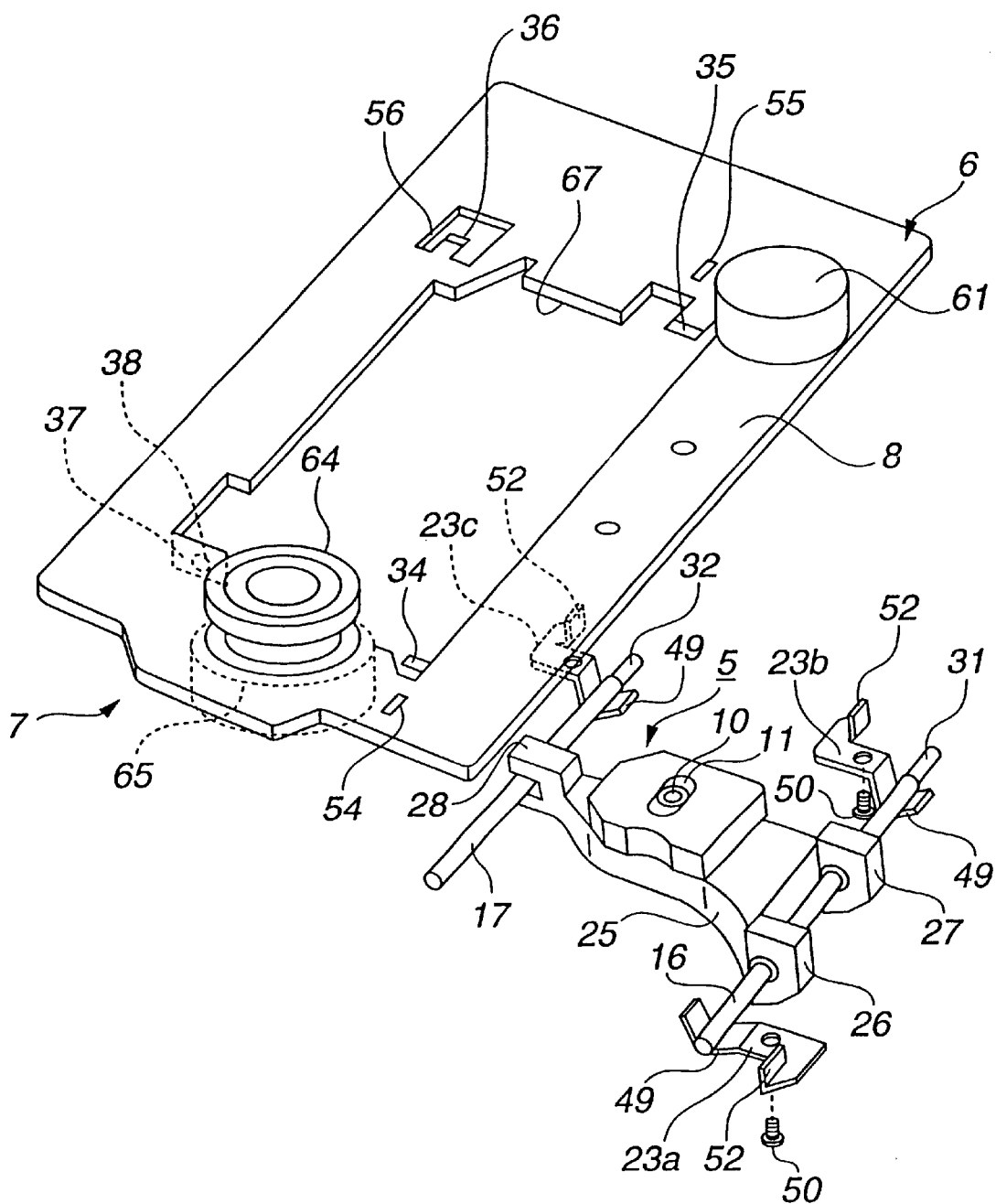
FIG. 2 is an exploded perspective view showing an optical pickup and a feed mechanism comprised in the disk drive apparatus.

As shown in FIGS. 1 and 2, the disk drive apparatus comprises an optical pickup 5 for recording/reproducing information on/from an optical disk 2, a feed mechanism 6 for feeding the optical pickup 5 in the radial direction of the optical disk 2, a disk rotation drive mechanism 7 for rotating and driving the optical disk 2, and a support base 8 for supporting the feed mechanism 6 and the disk rotation drive mechanism 7.

Also as shown in FIGS. 1 and 2, the optical pickup 5 includes an optical system having an objective lens 10, a lens holder 11 for holding the objective lens 10, and a two-axis actuator (not shown) for moving the lens holder 11 in two axial directions, i.e., the focusing direction parallel to the optical axis of the objective lens 10 and the tracking direction perpendicular to the optical axis of the objective lens 10. This optical pickup 5 is provided to be movable through the feed mechanism 6.

Also as shown in FIGS. 1 and 2, the feed mechanism includes a slide base 15 for supporting the optical pickup 5, a main guide shaft 16 and a sub guide shaft 17 for supporting the slide base 15 to be movable in the radial direction of the optical disk 2, and a drive mechanism 18 for feeding the slide base 15 along the axial directions of the main guide shaft 15 and the sub guide shaft 16.

The feed mechanism further includes first and second skew adjust members 21 and 22 for adjusting inclinations (hereinafter called skews) of the axial directions of the main guide shaft 16 and the sub guide shaft 17 with respect to the direction perpendicular to the recording track of the optical disk 2 and with respect to the tangential direction of the recording track of the optical disk 2, and elastic support members 23a, 23b, and 23c for supporting the main guide shaft 16 and the sub guide shaft 17 to be inclinable with respect to the axial directions.

Figure 3:
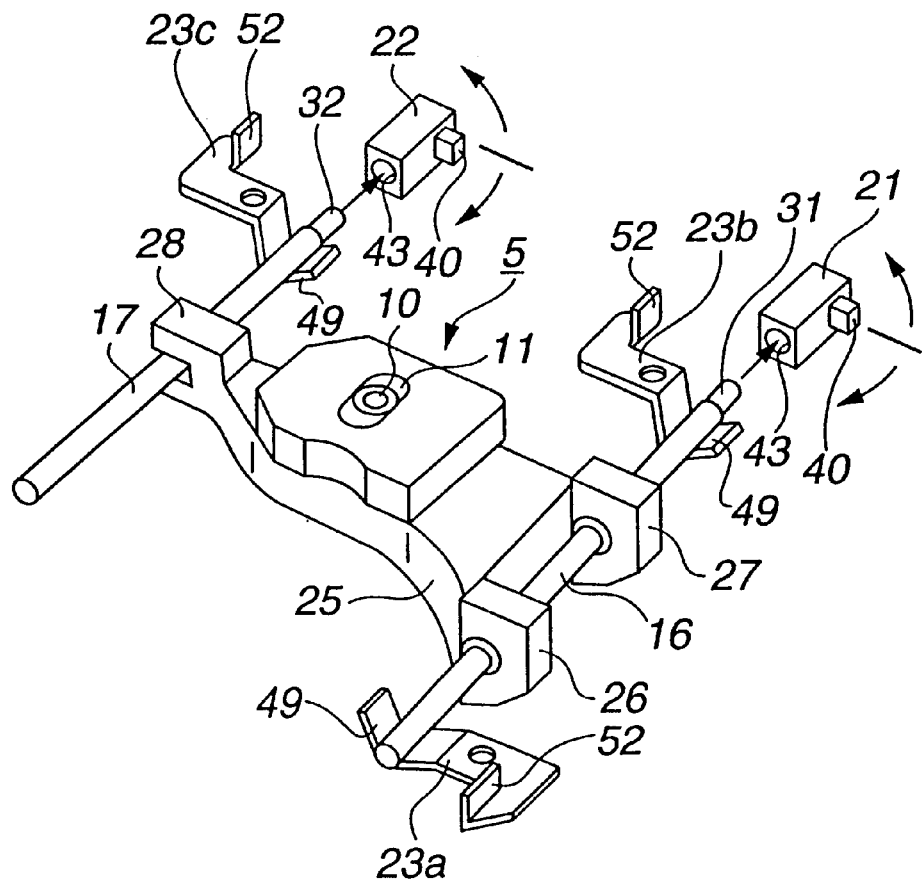
FIG. 3 is an exploded perspective view showing the feed mechanism.

As shown in FIGS. 2 and 3, the slide base 15 includes a hold part 25 for holding the optical pickup 5, first and second support parts 26 and 27 supported movably by the main guide shaft 16, and a third support part 28 supported movably by the sub guide shaft 17. The first and second support parts 26 and 27 and the third support part 28 are respectively formed integrally on two opposite sides of the hold part 25.

The main guide shaft 16 and the sub guide shaft 17 are provided such that their axial directions are parallel to the radial direction of the optical disk 2 and also parallel to each other. In addition, insertion parts 31 and 32 which have slightly smaller axial diameters are respectively formed integrally at those end portions of these main guide shaft 16 and sub guide shaft 17 that are supported on the first and second skew adjustment members 21 and 22.

Figure 4:
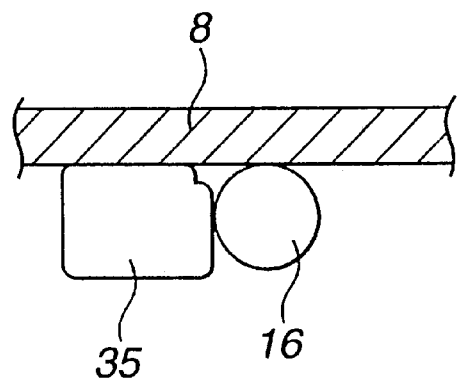
FIG. 4 is a side view showing a main guide shaft of the feed mechanism.

Also, the main guide shaft 16 and the sub guide shaft 17 are restricted to predetermined positions by limit members 34, 35, and 36 provided on the support base 8, as shown in FIGS. 1 and 4.

As shown in FIGS. 1 and 4, the limit members 34 and 35, which are in contact with the main guide shaft 16 and restrict the main guide shaft 16, are formed integrally on the support base 8 in both end sides of the main guide shaft 16, such that the limit members 34 and 35 are bent back and positioned so as to face the main guide shaft 16 sandwiched therebetween. Therefore, both end sides of the main guide shaft 16 are restricted to predetermined positions by the limit members 34 and 35, respectively.

Further, the limit member 36, which contacts the sub guide shaft 17 to restrict the position of the guide shaft 17, is bent back and integrally formed on the support base 8. In addition, a support member 37 having an insertion hole 38 in which the sub guide shaft 17 is inserted is bent back and integrally formed on the support base 8, as shown in FIG. 1. Therefore, the sub guide shaft 17 is restricted to a predetermined position by the support member 37 and the limit member 36.

Figure 5:
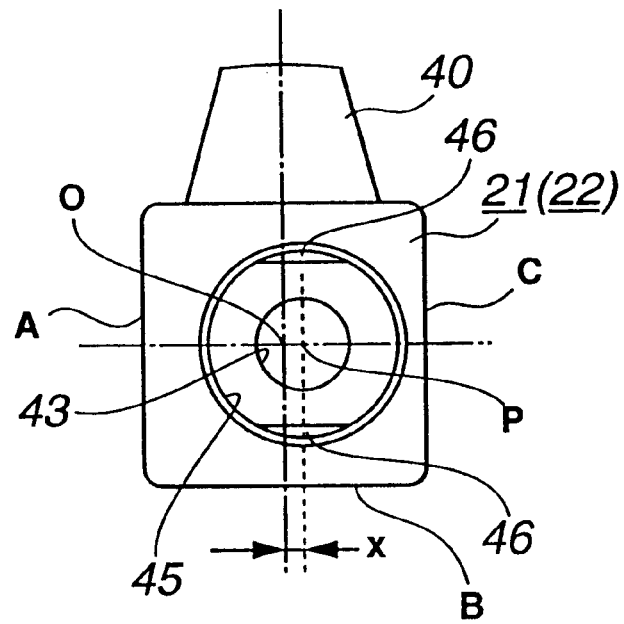
FIG. 5 is a front view showing a skew adjust member included in the feed mechanism.
Figure 6:
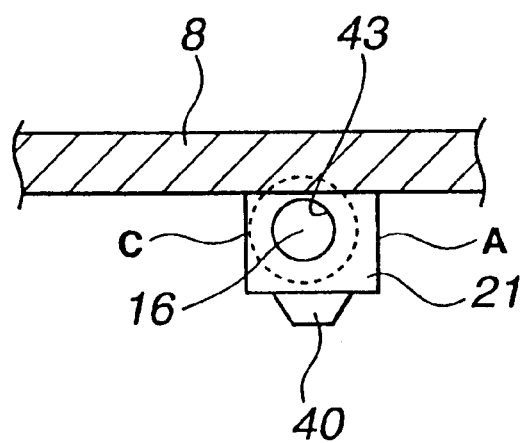
FIG. 6 is a side view showing the skew adjust member.
Figure 7:
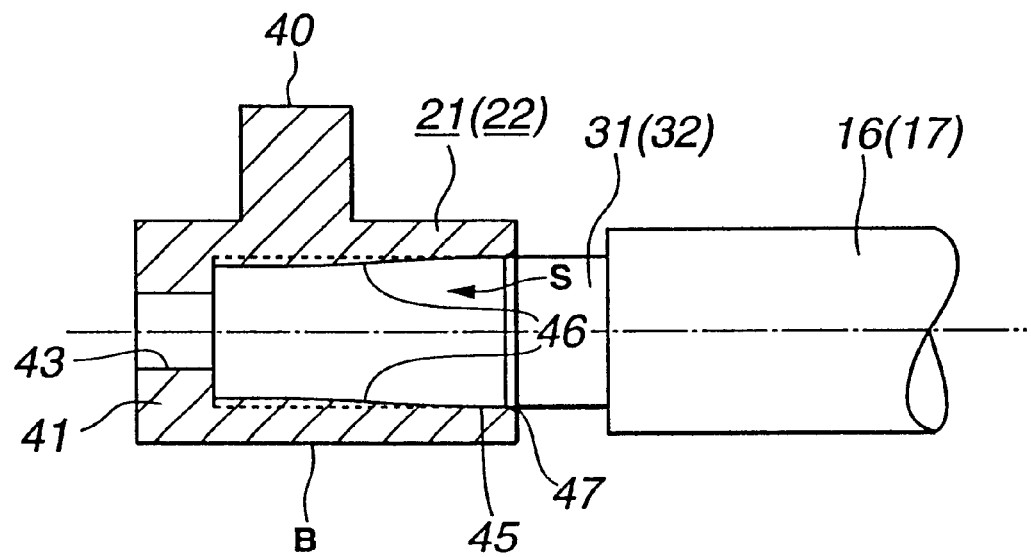
FIG. 7 is a longitudinal cross-sectional view showing the skew adjust member.

The first and second skew adjust members 21 and 22 are each formed, for example, of resin material into a substantially rectangular columnar shape, at end portions of main guide shaft 16 and the sub guide shaft 17, respectively. As shown in FIGS. 5, 6, and 7, these first and second skew adjust members 21 and 22 are formed such that their end surfaces which are substantially perpendicular to the axial directions of the main guide shaft 16 and the sub guide shaft 17 are substantially rectangular. The first, second, and third contact surfaces A, B, and C which are let contact the support base 8, as installation references, are formed in parallel with the axial direction, at outer circumferential portions of each of the first and second skew adjust members 21 and 22.

Operation members 40 for rotating the first and second skew adjust members 21 and 22 about the axes of the main guide shaft 16 and the sub guide shafts 17 are integrally formed on the fist and second skew adjust members 21 and 22, positioned on those surfaces that face the second contact surfaces of the outer circumferential portions. The operation members 40 function as index portions, and the rotation positions of the first and second skew adjust members 21 and 22 in each of which any of the first, second, and third contact surfaces A, B, and C is let contact the support base 8 can be visually observed by the positions of the operation members 40.

Figure 8:
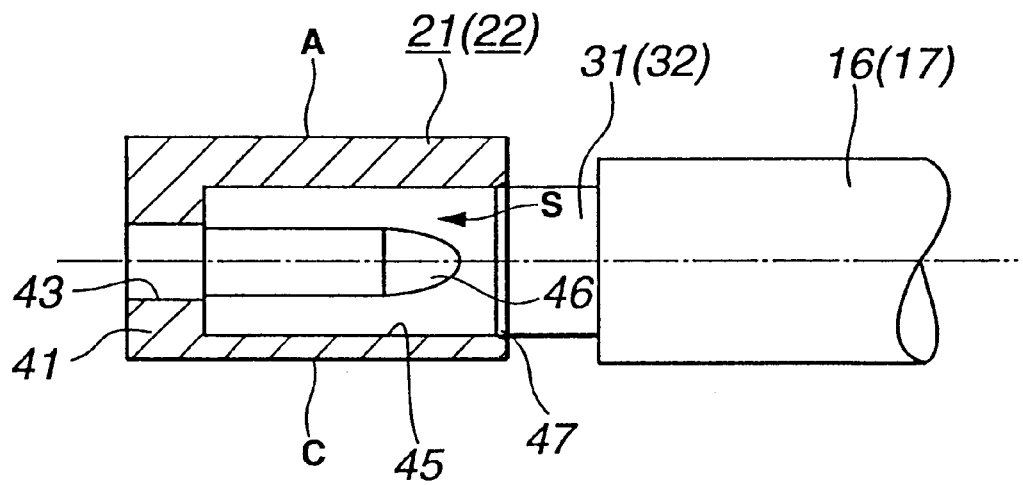
FIG. 8 is a lateral cross-sectional view showing the skew adjust member.

Formed in end surfaces of the first and second skew adjust members 21 and 22 are bearing parts 41 in which the insertion parts 31 and 32 of the main guide shaft 16 and the sub guide shaft 17 are inserted and supported, as shown in FIGS. 5, 7, and 8. As shown in FIG. 5, each of these bearing parts 41 has shaft holes 43 and 45 having a center P which is deviated by a deviation amount x from the center of the end surfaces. Therefore, the first and second skew adjust members 21 and 22 are respectively rotated about axis of the bearing parts 41, thereby changing any of the first, second, and third contact surfaces A, B, and C to any other one of them, so that the position of the center P of the shaft hole 45 of the bearing part 41 can be changed in accordance with the deviation amount x.

As shown in FIGS. 6, 7, and 8, each shaft hole 45 is formed such that a substantially cylindrical space part S having a diameter substantially equal to the shaft diameter of the insertion parts 31 and 32 of the main guide shaft 16 and the sub guide shaft 17 is opened in the end surface in the other side. On the inner surfaces of the shaft holes 45, convex portions 46 which are pressed into contact with the insertion parts 31 and 32 of the main guide shaft 16 and the sub guide shaft 17 are formed at opposed positions. When the insertion parts 31 and 32 of the main guide shaft 16 and the sub guide shaft 17 are inserted in the space parts S, these pars 31 and 32 are pressed against the convex portions 46 thereby causing friction, so that the skew adjust members 21 and 22 do not carelessly fall off from the main guide shaft 16 and the sub guide shaft 17. Also, the edge portions of the openings of the shaft holes 45 are beveled to form inclined surfaces 47 each having a funnel-like shape thereon, which serve as guides when the insertion parts 31 and 32 are inserted in the shaft holes 45.

Although the first and second skew adjust members 21 and 22 are each formed in a substantially rectangular columnar shape, each of the members 21 and 22 may naturally be formed in any other shape such as a hexagonal columnar shape, an octagonal columnar shape, or the like, as far as it is a polygonal shape having a plurality of contact surfaces which are brought into contact with the support base 8.

The elastic support members 23a, 23b, and 23c are each formed of elastic metal material in a plate-like shape and are provided respectively at positions in both end sides of the main guide shaft 16 and a position adjacent to the second skew adjust member 22, as shown in FIGS. 1 and 2.

As shown in FIGS. 2 and 3, the support members 49 for supporting the main guide shaft 16 and the sub guide shaft 17 are formed at top end portions of the elastic support members 23a, 23b, and 23c, such that the support members 49 are each bent to have a V-shaped cross section. The elastic support members 23a, 23b, and 23c are fixed to the support base 8 with fixing screws 50 and energize the main guide shaft 16 and the sub guide shaft 17 toward the side of the main surface of the support base 8.

Engage crows 52 to be engaged with the support base 8 are bent back and formed at the base end portions of the elastic support members 23a, 23b, and 23c, so that these elastic support members 23a, 23b, and 23c are steadily prevented from being dislocated.

As shown in FIGS. 1 and 2, engage holes 54, 55, and 56 in which the engage claws 52 of the elastic support members 23a, 23b, and 23c are respectively engaged are provided in the main surface of the support base 8. By these elastic support members 23a, 23b, and 23c, the main guide shaft 16 and the sub guide shaft 17 can be securely supported since the support members 49 are elastically deformed when main guide shaft 16 and the sub guide shaft 17 are displaced as the first and skew adjust members 21 and 22 are adjusted.

The drive mechanism 18 includes a rack member 60 for moving the slide base 15, and a group of plural gears (not shown), and a feed motor 61 for driving and rotating the group of gears, as shown in FIGS. 1 and 2. As shown in FIG. 1, the rack member 60 is attached to the first and second support parts 26 and 27, and the rack part 62 engaged with the group of gears is formed in parallel with the axial direction of the main guide shaft 16. The feed motor 61 is provided on the support base 8 and is driven to rotate thereby moving the slide base 15 in the radial direction of the optical disk 2 through the group of gears and the rack member 60.

As shown in FIGS. 1 and 2, the disk rotation drive mechanism 7 includes a disk table 64 where the optical disk 2 is set, and a spindle motor 65 for driving and rotating the disk table 64. The spindle motor 65, as shown in FIG. 1, is provided on the support base 8 and positioned in one end side between the main guide shaft 16 and the sub guide shaft 17.

An opening portion 67 which allows the optical pickup 5 to be movable in the radial direction of the optical disk 2 is provided in the main surface of the support base 8, as shown in FIGS. 1 and 2. The optical pickup 5 is provided within the opening portion 67.

With respect to the disk drive apparatus constructed as described above, explanation will now be made of operation for adjusting each of skews in the radial direction and the tangential direction of the optical pickup 5 by means of the first and second skew adjust members 21 and 22.

At first, a state where the inclinations of the axial directions of the main guide shaft 16 and the sub guide shaft 17 are changed with respect to the first and second skew adjust members 21 and 22 comprised in the feed mechanism 6 will be explained with reference to the drawings. As shown in FIG. 9(a), when the first contact surfaces A are brought into contact with the support base 8, the first and second skew adjust members 21 and 22 are each positioned such that the centers P are positioned at a height $h_1$ where the center P of each bearing part 41 in the direction perpendicular to the main surface of the support base 8 is a height. When the second contact surfaces B are brought into contact with the support base 8, as shown in FIG. 9(b), the position of each center P is changed to a height $h_2$. Likewise, when the third contact surfaces C are brought into contact with the support base 8, as shown in FIG. 9(c), the first and second skew adjust members 21 and 22 are each positioned such that the position of each center P is changed to a height $h_3$.

Therefore, the position of the center P of each bearing part 41 can be changed with respect to the support base 8, by selectively bringing the first, second, and third contact surfaces A, B, and C into contact with the support base 8.

With respect to the first and second skew adjust members 21 and 22, the following Table 1 shows changes of inclination angles (°) as skews of the optical pickup corresponding to the first, second, and third contact surfaces A, B, and C, in case where the eccentricity x of the center P of each bearing part 41 deviated from a center O is set to, for example, 0.075, 0.15, and 0.23.

TABLE 1

The distance between fulcrums at both ends of each guide shaft is 86 mm.

| | Contact surface | | |
|---|---|---|---|
| Eccentricity x | A | B | C |
| 0.075 ± 0.015 | −0.05° | 0° | +0.05° |
| 0.15 ± 0.015 | −0.10° | 0° | +0.10° |
| 0.23 ± 0.015 | −0.15° | 0° | +0.15° |

As shown in the Table 1, according to the first and second skew adjust members 21 and 22, the inclination angles can be respectively adjusted easily in the plus and minus directions with respect to the inclination angles at the second contact surfaces, by rotating and operating the skew adjust members 21 and 22 such that the first or third contact surfaces are brought into contact with the support base 8 where each second contact surface B is used as a reference. In addition, with respect to the first and second skew adjust members 21 and 22, the inclination angles which are adjusted in accordance with rotation can be set larger by increasing the eccentricity x of the center P of each bearing part.

Therefore, according to the first and second skew adjust members 21 and 22, the optical pickup 5 can be set to be inclined only by a predetermined inclination angle if the contact surfaces being in contact with the support base 8 are changed appropriately by deviating the members 21 and 22 by a predetermined eccentricity x in compliance with a desired adjustment range of skews of the optical pickup.

In order to distinguish clearly different eccentricities x, the skew adjust members 21 and 22 may be formed of resins in colors different from each other in correspondence with the eccentricities x.

Explained next will be a state in which skews of the optical pickup 5 in the radial direction and the tangential direction are respectively adjusted by rotating the first and second skew adjust members 21 and 22, in the disk drive apparatus constructed as described above.

When a skew in the radial direction is adjusted in the disk drive apparatus, the inclinations of the main guide shaft and the sub guide shaft 17 in the radial direction are changed by rotating respectively the first and second skew adjust members 21 and 22. Thus, the optical axis of the objective lens 10 of the optical pickup 5 is adjusted in the radial direction.

Also, when a skew in the tangential direction is adjusted the disk drive apparatus, the inclination of the main guide shaft 16 or the sub guide shaft 17 in the tangential direction is changed by rotating one of the first and second skew adjust members 21 and 22. Thus, the optical axis of the objective lens 10 of the optical pickup 5 is adjusted in the tangential direction.

When only the skew in the tangential direction is adjusted, the skew can be adjusted if a skew adjust member is attached only to either the main guide shaft 16 or the sub guide shaft 17. In this case, for example, the skew adjust member 21 may be attached to the main guide shaft 16 and the sub guide shaft 17 may be substituted by a guide rail.

In the disk drive apparatus constructed as described above, the optical disk 2 is rotated by the disk rotation drive mechanism 7, and optical pickup 5 is moved in the radial direction of the optical disk 2, thereby to record and/or reproduce information on and/or from a desired recording track of the optical disk 2.

As described above, in the disk drive apparatus, the feed mechanism 6 comprises first and second skew adjust members 21 and 22, so that skews in the axial directions of the main guide shaft 16 and the sub guide shaft 17 can be easily adjusted by rotating the first skew adjust member 21 and/or the second skew adjust member 22. Therefore, it is possible to adjust easily and steadily skews in the radial direction and the tangential direction, as inclinations of the optical pickup 5 relatively to the optical disk 2.

The above-described disk drive apparatus is constructed such that the first and second skew adjust members 21 and 22 are provided as separate members at ends of the main guide shaft 16 and the sub guide shaft 17. However, in place of the separate skew adjust members, skew adjust parts may be formed to be integral with top end portions of the main guide shaft and the sub guide shaft.

As shown in FIG. 10, each of the main guide shaft 71 and the sub guide shaft 72 has a shaft part 73 which movably supports the slide base, and a skew adjust part 74 provided at an end portion of the shaft part 73 thereby to adjust the inclination of the axial direction.

Each skew adjust part 74, as shown in FIG. 10, is formed in a polygonal columnar shape having a regular octagonal end surface substantially perpendicular to the axial direction of the shaft part 73. First to eighth contact surfaces 75a to 75h parallel to the axial direction of the shaft part 73 are formed at the circumferential portion. Further, each skew adjust part 74 is formed such that the center of the end surface of the shaft part 73 is deviated by a predetermined eccentricity y from the center of the end surface.

Therefore, according to the skew adjust parts 74, the height as a position in the direction perpendicular to the main surface of the support base 8 can be easily adjusted in multiple steps by rotating the main guide shaft 71 and the sub guide shaft 72 about their axes, to change the contact surfaces 75a to 75h.

The disk drive apparatus according to the present invention can be preferably applied to a disk drive apparatus which records and/or reproduces information on and/or from an optical disk such as a CD (Compact Disk), CD-R (Recordable), CD-RW (Rewritable), DVD (Digital Versatile Disk), or the like, a magneto-optical disk, or the like.

What is claimed is:

1. A disk drive apparatus comprising:
   a slide base having an optical pickup for recording and/or reproducing information on and/or from an optical disk;
   main and sub-guide shafts provided in parallel with an radial direction of the optical disk, for supporting movably the slide base;
   a support base for supporting the main and sub-guide shafts; and
   an adjust member having a bearing part provided such that a center of a shaft hole in an end of the main guide shaft and/or the sub-guide shaft is inserted and supported is deviated from a center of an end surface substantially perpendicular to the axial direction of the main guide shaft and/or the sub-guide shaft, and a plurality of contact surfaces, which form a substantially polygonal outer circumference and are brought into contact with the support base, thereby to adjust an inclination of the axial direction of the main guide shaft and/or the sub-guide shaft.

2. The disk drive apparatus according to claim 1, wherein each of the adjust member has a reference portion on the outer circumference, to indicate a rotating position of rotation about an axis of the main guide shaft and/or the sub-guide shaft of the adjust member.

3. The disk drive apparatus according to claim 2, wherein the reference portion is an operation part for rotating and operating the adjust member about the axis of the main guide shaft and/or the sub-guide shaft.

4. A disk drive apparatus comprising:

a slide base having an optical pickup for recording and/or reproducing information on and/or from an optical disk;

a guide shaft provided along a radial direction of the optical disk, for supporting movably the slide base;

a support base for supporting the guide shafts;

an adjust member having a bearing part, an outer circumference formed in a substantially polygonal shape, and a plurality of contact surfaces to be brought into contact with the support base, thereby to adjust an inclination of an axial direction of the guide shaft, the bearing part being provided such that a center of a shaft hole in which an end of the guide shaft is inserted and supported is deviated from a center of an end surface substantially perpendicular to the axial direction of the guide shaft; and an elastic member for supporting the guide shaft to be inclinable with respect to the axial direction.

5. The disk drive apparatus according to claim 4, wherein the adjust member has a reference portion on the outer circumference, to indicate a rotating position of rotation about an axis of main guide shaft of the adjust member.

6. A skew adjust apparatus comprising:

a slide base having an optical pickup for recording and/or reproducing information on and/or from an optical disk;

a guide shaft provided along radial direction of the optical disk, for supporting movably the slide base; and a support base for supporting the guide shafts, wherein the skew adjust apparatus adjusts an inclination of an axial direction of the guide shaft, and further comprises a bearing part, an outer circumference formed in a substantially polygonal shape, and a plurality of contact surfaces to be brought into contact with the support base, the bearing part being provided such that a center of a shaft hole in which an end of the guide shaft is inserted and supported is deviated from a center of an end surface substantially perpendicular to the axial direction of the guide shaft.

7. The skew adjust apparatus according to claim 6, wherein the adjust member has a reference portion on the outer circumference, to indicate a rotating position of rotation about an axis of the main guide shaft of the adjust member.

* * * * *

UNITED STATES PATENT AND TRADEMARK OFFICE
CERTIFICATE OF CORRECTION

PATENT NO. : 6,577,585 B2
DATED : June 10, 2003
INVENTOR(S) : Takashi Aoyama et al.

It is certified that error appears in the above-identified patent and that said Letters Patent is hereby corrected as shown below:

<u>Column 8,</u>
Line 59, replace "an" with -- a --.

Signed and Sealed this

Fourteenth Day of October, 2003

JAMES E. ROGAN
*Director of the United States Patent and Trademark Office*